(12) United States Patent
Luo et al.

(10) Patent No.: US 6,410,187 B1
(45) Date of Patent: Jun. 25, 2002

(54) PRIMARY ALKALINE BATTERY

(75) Inventors: Weifang Luo, Norwood; Bhupendra K. Patel, Mansfield; Alexander B. Shelekhin, Acton; John D. Sillesky, Franklin; Viet H. Vu, Medway; Douglas Woodnorth, Needham, all of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/393,043

(22) Filed: Sep. 9, 1999

(51) Int. Cl.[7] ............ H01M 4/06; H01M 6/06; H01M 6/08

(52) U.S. Cl. ............ 429/206; 429/164; 429/165; 429/209; 429/246

(58) Field of Search .................. 429/164, 165, 429/206, 224, 229, 209, 246

(56) References Cited

U.S. PATENT DOCUMENTS

| | | |
|---|---|---|
| 1,995,294 A | 3/1935 | Cullen |
| 4,281,046 A | 7/1981 | Davis, Jr. |
| 4,283,470 A | 8/1981 | Freeman et al. |
| 4,318,968 A | 3/1982 | Berger et al. |
| 4,360,575 A | 11/1982 | Brennan |
| 5,045,415 A | 9/1991 | Witehira |
| 5,248,572 A | 9/1993 | Shoji et al. |
| 5,294,499 A | 3/1994 | Furkawa et al. |
| 5,434,019 A | 7/1995 | Zhang et al. |
| 5,472,806 A | 12/1995 | Meintjes |
| 5,482,796 A | 1/1996 | Wang et al. |
| 5,532,078 A | 7/1996 | Redey et al. |
| 5,545,492 A | 8/1996 | Zito |
| 5,576,116 A | 11/1996 | Sanchez et al. |
| 5,639,578 A | 6/1997 | Urry |
| 5,674,639 A | 10/1997 | Urry |
| 5,677,080 A | 10/1997 | Chen |
| 5,682,288 A | 10/1997 | Wani |
| 5,821,012 A | 10/1998 | McCullough |
| 5,869,205 A | 2/1999 | Mick et al. |
| 5,948,561 A | 9/1999 | Urry |
| 6,074,781 A * | 6/2000 | Jurca ............ 429/165 |

FOREIGN PATENT DOCUMENTS

| | | |
|---|---|---|
| FR | 2 622359 | 4/1989 |
| GB | 2 231 196 | 11/1990 |
| JP | 2-295063 | 12/1990 |
| JP | 7-326347 | 12/1995 |
| JP | 7-326370 | 12/1995 |
| WO | WO 97/16863 | 5/1997 |
| WO | WO 00/01022 | 1/2000 |

* cited by examiner

Primary Examiner—Patrick Ryan
Assistant Examiner—Jonathan Crepeau
(74) Attorney, Agent, or Firm—Fish & Richardson P.C.

(57) ABSTRACT

A primary alkaline battery includes a housing, a cathode within the housing, an anode within the housing, and a separator electrically separating the anode and the cathode. The battery has a substantial $(S/V)^2$ value.

46 Claims, 6 Drawing Sheets

PRIMARY ALKALINE BATTERY

BACKGROUND OF THE INVENTION

This invention relates to batteries.

Batteries, such as alkaline batteries, are commonly used as energy sources. Generally, alkaline batteries include a cathode, an anode, a separator, and an electrolytic solution. The cathode is typically formed of an active material (e.g., manganese dioxide), carbon particles, and a binder. The anode can be a gel including an active material (e.g., zinc particles). The separator is usually disposed between the cathode and the anode. The electrolytic solution, which is dispersed throughout the battery, can be a hydroxide solution.

Alkaline batteries include the conventional AA, AAA, AAAA, C, and D batteries commonly sold in stores. These conventional alkaline batteries include a cylindrical container containing a central, cylindrical zinc gel anode surrounded by a ring-shaped manganese dioxide cathode.

It generally is desirable for a battery to have a long service life. One measure of the service life of a battery is the length of time the battery can discharge under a given load before the voltage drops to an unacceptable level.

SUMMARY OF THE INVENTION

The invention relates to a battery having a good service life when discharged continuously, for example, at 1 amp. The good service life is provided by including a high interface area between the cathode and the anode in the battery.

One way to provide a relative measure of interface area between the anode and the cathode is to approximate the "effective thickness" of the cathode. For a particular battery (e.g., a AA battery), the smaller the cathode thickness, the greater the interface area per cathode volume. The relative effective thickness of a cathode can be estimated by using the equation $(S/V)^2$ where S is the separator surface area and anode and V is the cathode volume.

In another aspect, the invention features a AA battery in which $(S/V)^2$ is greater than 0.38, preferably greater than 0.40, and more preferably greater than 0.42 or 0.45.

In another aspect, the invention features a AAA battery in which $(S/V)^2$ is greater than 0.70, preferably greater than 0.75, and more preferably greater than 0.80 or 0.82.

In another aspect, the invention features a AAAA battery in which $(S/V)^2$ is greater than 1.2, preferably greater than 1.3, and more preferably greater than 1.4 or 1.5.

In another aspect, the invention features a C battery in which $(S/V)^2$ is greater than 0.110, preferably greater than 0.120, and more preferably greater than 0.125 or 0.130.

In another aspect, the invention features a D battery in which $(S/V)^2$ is greater than 0.65, preferably greater than 0.70, and more preferably greater than 0.75, 0.80, 0.9, or 1.0.

In another aspect, the invention features a AA battery including a single cavity anode within the cathode. The $(S/V)^2$ of the battery is greater than 0.15, preferably greater than 0.20, and more preferably greater than 0.30, 0.35, or 0.40.

In another aspect, the invention features a AAA battery including a single cavity anode within the cathode. The $(S/V)^2$ of the battery is greater than 0.3, preferably greater than 0.4, and more preferably greater than 0.5 or 0.6.

In another aspect, the invention features a AAAA battery including a single cavity anode within the cathode. The $(S/V)^2$ of the battery is greater than 0.6, preferably greater than 0.8, and more preferably greater than 1.0, 1.2 or 1.5.

In another aspect, the invention features a C battery including a single cavity anode within the cathode. The $(S/V)^2$ of the battery is greater than 0.06, preferably greater than 0.08, and more preferably greater than 0.09, 0.10, or 0.11.

In another aspect, the invention features a D battery including a single cavity anode within the cathode. The $(s/v)^2$ of the battery is greater than 0.03, preferably greater than 0.04, and more preferably greater than 0.05, 0.06, 0.07, or 0.08.

In another aspect, the invention features a battery including a cylindrical housing, a first electrode, and a one-cavity second electrode within the first electrode. The battery has a $(S/V)^2$/cathode OD vs. cell diameter value of at least 0.01, more preferably at least 0.02, and most preferably at least 0.03 or 0.04, above Plot A, which is subsequently defined.

In another aspect, the invention features a battery including a cylindrical housing, a first electrode, and a second electrode within the first electrode. The battery has a $(S/V)^2$/cathode OD vs. cell diameter value of at least 0.01, more preferably at least 0.02, and most preferably at least 0.03 or 0.04, above Plot B, which is subsequently defined.

Preferably, the batteries described above have a cathode including manganese dioxide and an anode including zinc.

In some preferred embodiments, one electrode (e.g., the anode) includes a lobed cavity within the other electrode. The lobed cavity may include, for example, two, three, four, five, or nine lobes. In fact, in another aspect, the invention features a battery including a nine-lobed electrode.

In other preferred embodiments, one electrode (e.g., the anode) includes multiple cavities within the other electrode. For example, the multiple cavities may include cylindrical cavities, D-shaped cavities, or pie-shaped cavities. The cavities may be connected by a narrow connecting portion.

Other features and advantages of the invention will be apparent from the description of the preferred embodiments thereof, and from the claims.

DESCRIPTION OF THE PREFERRED EMBODIMENTS

Figure 1:
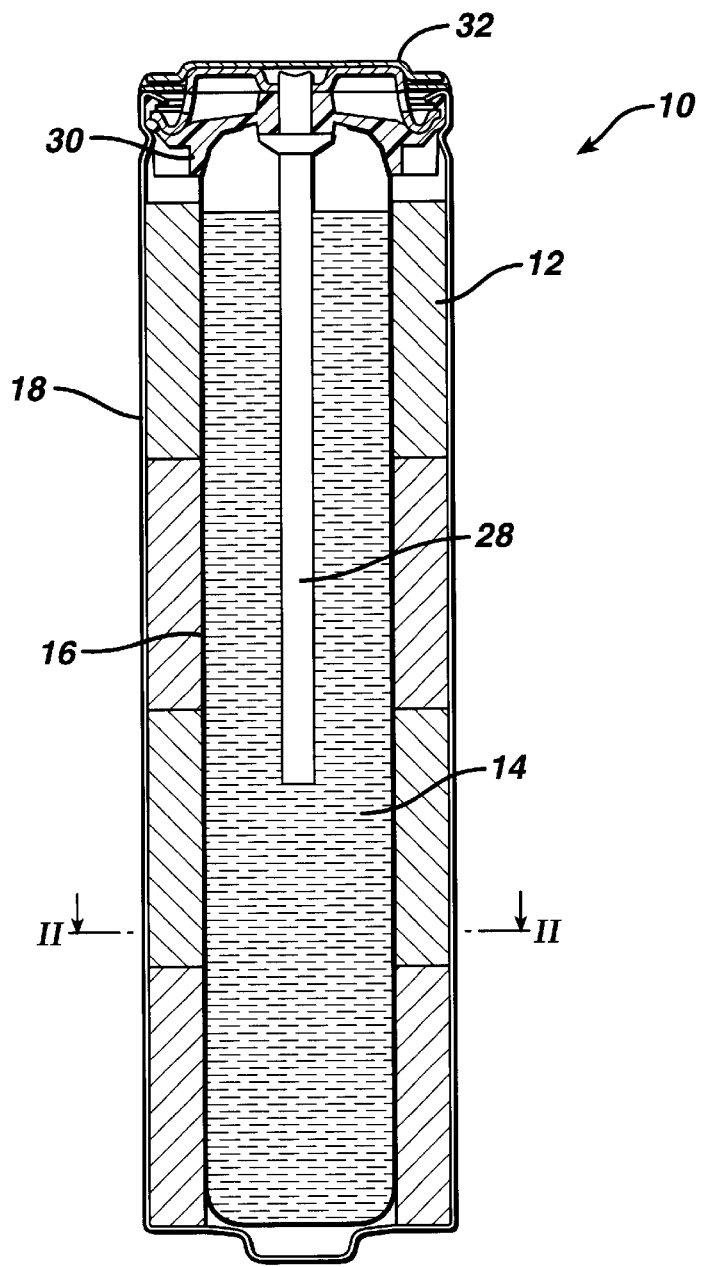
FIG. 1 is a side-sectional view of a battery including a central anode having five lobes taken through the center of the battery.
Figure 2:
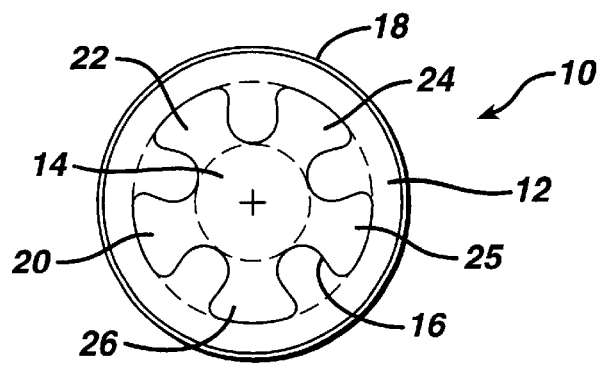
FIG. 2 is a cross-sectional view of the battery in FIG. 1, taken at II—II in FIG. 1.

Referring to FIGS. 1 and 2, battery 10 includes a cathode 12, an anode 14, separator 16 and a cylindrical housing 18.

Anode 14 includes five lobes (20, 22, 24, 25, and 26). Battery 10 also includes current collector 28, seal 30, and a negative metal top cap 32, which serves as the negative terminal for the battery. The cathode is in contact with the housing, and the positive terminal of the battery is at the opposite end of the battery from the negative terminal. An electrolytic solution is dispersed throughout battery 10. For purposes of the dimensions for the example described below, battery 10 is a AA battery.

Cathode 12 includes manganese dioxide, carbon particles, and a binder.

Any of the conventional forms of manganese dioxide used for cathodes can be used. The preferred manganese dioxide is EMD, although CMD can also be used. Distributors of such manganese dioxides include Kerr McGee, Co. (Trona D), Chem Metals, Co., Tosoh, Delta Manganese, Mitsui Chemicals and JMC. Generally, the cathode will include between 80% and 88% of manganese dioxide by weight.

The carbon particles also can be any of the conventional carbon particles used in cathodes. They can be synthetic or nonsynthetic, and they can be expanded or nonexpanded. In certain embodiments, the carbon particles are nonsynthetic, nonexpanded graphite particles. In these embodiments, the graphite particles preferably have an average particle size of less than about 20 microns, more preferably from about 2 microns to about 12 microns, and most preferably from about 5 microns to about 9 microns as measured using a Sympatec HELIOS analyzer. Nonsynthetic, nonexpanded graphite particles can be obtained from, for example, Brazilian Nacional de Grafite (Itapecirica, MG Brazil (MP-0702X). Generally, the cathode will include between 5% and 8% of carbon particles by weight.

Examples of binders include polyethylene powders, polyacrylamides, Portland cement and fluorocarbon resins, such as PVDF and PTFE. An example of a polyethylene binder is sold under the tradename Coathylene HA-1681 (Hoescht). Generally, the cathode includes between 0.1 percent to about 1 percent of binder by weight.

Cathode 12 can include other additives. Examples of these additives are disclosed in U.S. Pat. No. 5,342,712, which is hereby incorporated by reference. Cathode 12 may include, for example, from about 0.2 weight percent to about 2 percent $TiO_2$ weight.

The electrolyte solution also is dispersed through cathode 12, and the weight percentages provided above are determined after the electrolyte solution has been dispersed.

Anode 14 can be formed of any of the standard zinc materials used in battery anodes. For example, anode 14 can be a zinc gel that includes zinc metal particles, a gelling agent and minor amounts of additives, such as gassing inhibitor. In addition, a portion of the electrolyte solution is dispersed throughout the anode.

The zinc particles can be any of the zinc particles conventionally used in gel anodes. Other examples of zinc particles used in the anode include these described in U.S. Ser. No. 08/905,254, now U.S. Pat. No. 6,284,410, U.S. Ser. No. 09/115,867, now abandoned and U.S. Ser. No. 09/156,915, which are assigned to the assignee in the present application and are hereby incorporated by reference. Generally, the anode includes between 67% and 71% of zinc particles by weight.

Gelling agents that can be used in anode 14 include polyacrylic acids, grafted starch materials, salts of polyacrylic acids, polyacrylates, carboxymethylcellulose or combinations thereof. Examples of such polyacrylic acids are Carbopol 940 and 934 (B.F. Goodrich) and Polygel 4P (3 V), and an example of a grafted starch material is Waterlock A221 (Grain Processing Corporation, Muscatine, IA). An example of a salt of a polyacrylic acid is Alcosorb G1, (Ciba Specialties). The anode generally includes from 0.1 percent to about 1 percent gelling agent by weight. These weight percentages correspond to when the electrolytic solution is dispersed throughout the anode.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of nonwoven, non-member material with one layer being disposed along a surface of the other. To minimize the volume of separator 16 while providing an efficient battery, each layer of nonwoven, non-membrane material can have a basis weight of about 54 grams per square meter, a thickness of about 5.4 mils when dry and a thickness of about 10 mils when wet. In these embodiments, the separator preferably does not include a layer of membrane material or a layer of adhesive between the nonwoven, non-membrane layers. Generally, the layers can be substantially devoid of fillers, such as inorganic particles.

In other embodiments, separator 16 includes an outer layer of cellophane with a layer of nonwoven material. The separator also includes an additional layer of nonwoven material. The cellophane layer can be adjacent cathode 12 or the anode. Preferably, the nonwoven material contains from about 78 weight percent to about 82 weight percent PVA and from about 18 weight percent to about 22 weight percent rayon with a trace of surfactant. Such nonwoven materials are available from PDM under the tradename PA36.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the outer circumference of cathode 12 or both. This conductive layer can be formed, for example, of a carbonaceous material. Such materials include LB1000 (Timcal), Eccocoat 257 (W. R. Grace & Co.), Electrodag 109 (Acheson Industries, Inc.), Electrodag 112 (Acheson) and EB0005 (Acheson). Methods of applying the conductive layer are disclosed in, for example, Canadian Patent No. 1,263,697, which is hereby incorporated by reference.

Current collector 28 is made from a suitable metal, such as brass. Seal 30 can be made, for example, of nylon.

An example of battery 10 (AA) was prepared according to the following procedure. An $MnO_2$ cathode mix is prepared by combining 85.5% EMD (from Kerr McGee), 7.3% graphite (Coathylene HA1681 from Hoescht), 0.3% polyethylene binder (MP-0702X from Nacional de Graphite), and 6.9% electrolyte solution. The $MnO_2$ mix then is compressed under pressure in a die slotted with a five lobe cavity using the following equipment and procedure:

Equipment:

Carver Automatic Press, 3888, 1DI0A00, Pellet Die Assembly (Pellet Die Sleeve, Bottom Punch and Core Pin, 29.88 mm, height gage, Top Punch and Core Extractor, Bottom Plate), Balance (3 decimal place), Digital Calipers (0.01 mm).

Procedure:

1. Assemble the pellet die tooling by placing the core pin inside the bottom punch. Slide the pellet die sleeve over the core pin and bottom punch and place the assembly on the bottom plate.
2. Weigh out the granulated $MnO_2$ mix and pour evenly into the assembly.
3. Place the top punch over the core road and press down until the punch is seated. Slide the height gage around the punch rod.
4. Place the core remover on top of the assembly and load the assembly inside the Carver Automatic Press.
5. Set the press to 5000 psi compression strength and 75% compression speed. Dwell time is set at 4 seconds.
6. Depress both the activator buttons to raise the assembly until 700 psi registers on the read-out. Allow the press to finish its cycle.
7. Remove the assembly and place the core remover on the bottom of the pellet die assembly. Insert the core pin remover into the assembly and place back into the press.
8. Depress both of the activator buttons until the top punch closes to approximately 1 cm of the pellet die sleeve. If a read-out in excess of 400 psi occurs, reject the pellet.
9. Remove the core rod and reinsert the assembly. Place the core remover over the assembly and place in the press.
10. Depress the activator buttons until the pellet die sleeve has been separated from the formed pellet.
11. Measure the height of each pellet. Reject any pellets that are not in spec (10.85+/−0.15 mm). Place all in-spec material in a moisture resistant heat sealable bag and label for the Recompaction Procedure.

Four pellets were inserted into a housing (a DBD can with flattened rim area) and recompacted inside the housing using the following equipment and procedure:

Equipment:

Carver Automatic Press, 38881DI0A00, Pellet Recompaction Assembly (can sleeve, PIP Backing Plate, Recompaction die and 3 prong can remover, core pin, punch retainer, and bottom plate), Balance (3 decimal place), Digital Calipers (0.01 mm).

Procedure:

1. Slide the recompaction die onto the punch retainer.
2. Select 4 pellets and measure and record the height and weight of each in-spec pellet.
3. Slide each pellet onto the core pin. Reject any pellets that are too tight or become cracked or chipped.
4. Place a bottom insulator into the DBD can and slide over the stacked pellets. Make sure the can is firmly pressed down all the way.
5. Place the can sleeve over the can and place the PIP support on top of the assembly. Insert the 3 prong can remover into the hole in the punch retainer. Place the assembly inside the Carver Automatic Press.
6. Switch the press to manual mode and set to 1500 psi compression strength and 30% compression speed.
7. Depress both of the activator buttons to raise the assembly until 1500 registers on the read-out. When the dwell time reads 4 seconds, depress the stop button.
8. Remove the can sleeve and PIP support from the assembly.
9. Place the two columns of the support blocks (3 inch height/double stack) inside the press. Place the recompacted can, with the punch retainer and recompaction die, between the two columns and over the edges of the support blocks.
10. Depress both of the activator buttons to raise the assembly until the can freely slides away from the core pin assembly.
11. Keep the recompaction die in place to facilitate the insertion of the separator.

The separator (P.G.I. Nonwoven 7638) is placed within the five lobe cavity. An anode mixture was prepared by combining (in weight percentages) 70% zinc powder (Zinc Corp. of America 1216), a gelling agent (Carbopol 940 from BF Goodrich), and 30% electrolyte (composed of 98.6% liquid electrolyte and 1.4% of the dissolved gelling agent). The anode mixture then was dispersed into the cavities. The top assembly including top cap 32, current collector 28, and seal 30, was placed over the housing and mechanically crimped over to seal the battery. A sealant (Spec Seal) was applied to the side of the housing prior to the assembly.

The surface area of separator 16 in battery 10 (AA battery) is 2149 $mm^2$. The surface area of the separator was calculated by determining the inner perimeter of cathode, and multiplying the perimeter by the cathode height. The cathode volume in battery 10 is 3200 $mm^3$. The cathode volume was calculated by determining the cross-sectional area of the cathode itself, and then multiplying the area with cathode height to give the volume. Thus, battery 10 has an $(S/V)^2$ value of 0.451.

Figure 3:
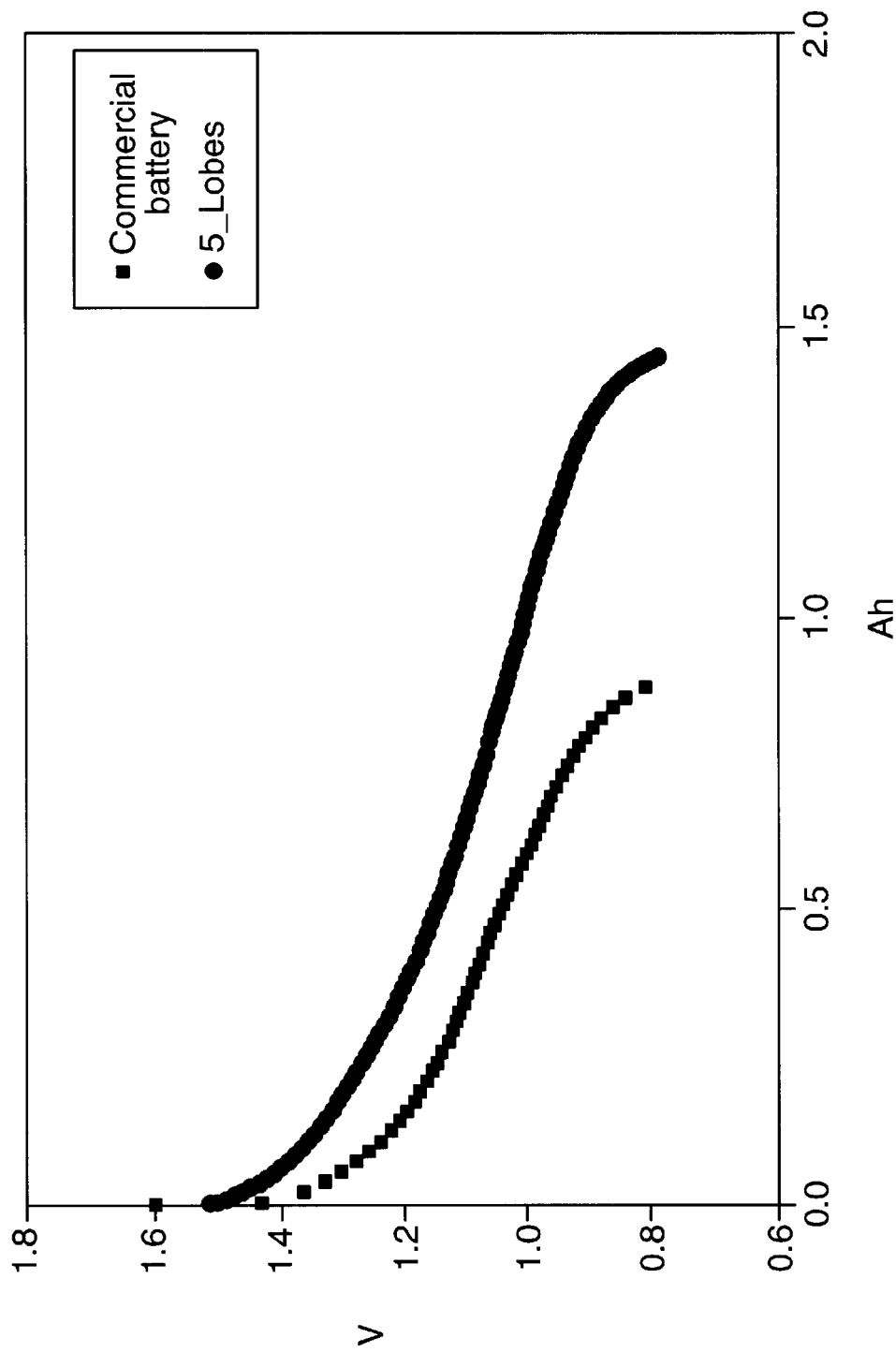
FIG. 3 is a plot of Voltage v. Capacity (Ah) for two AA batteries discharged continuously at 1 amp.

Referring to FIG. 3, battery 10 has a higher service life when discharged continuously at 1 amp, in comparison with a commercially available AA battery (ULTRA®) having the same components except including a cylindrical anode and having an $(S/V)^2$ value of 0.121.

Figure 4:
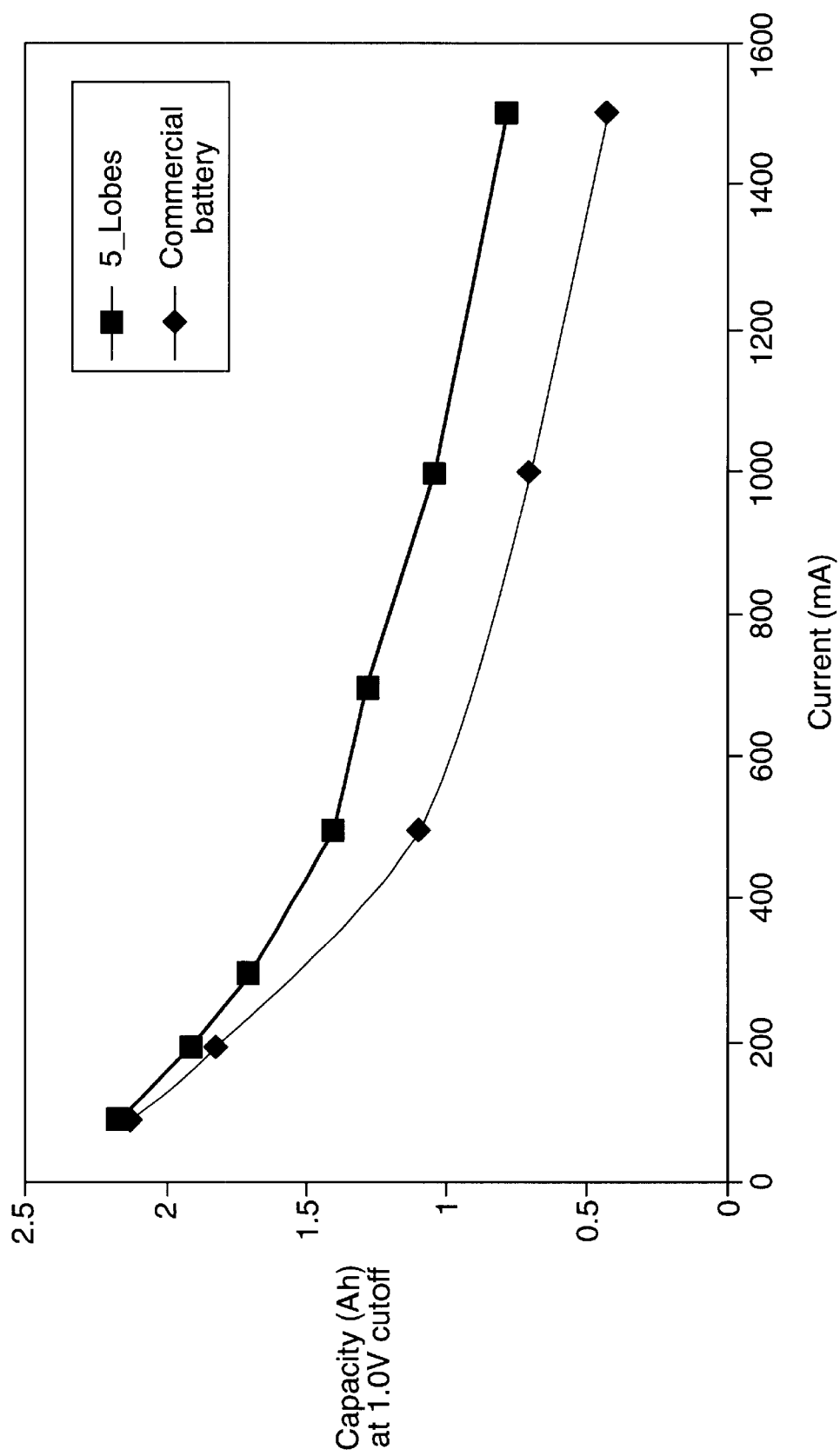
FIG. 4 is a plot of capacity (Ah) at 1.0V cutoff versus current (mA) for two AA batteries.

Referring to FIG. 4, the battery 10 has a higher capacity in comparison to the commercially available AA battery.

Figure 5:
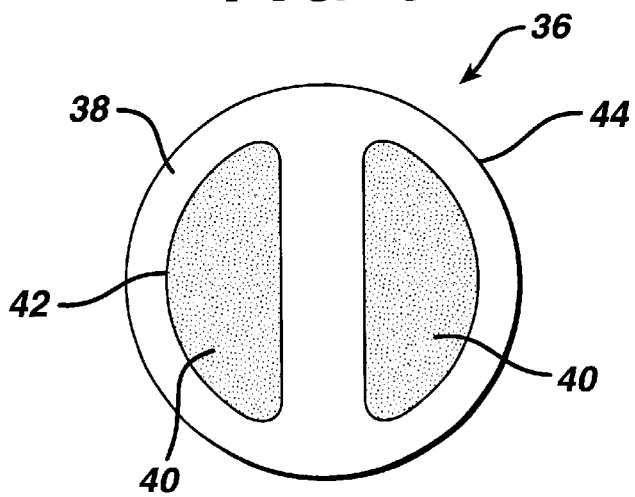
FIG. 5 is a cross-sectional view of a battery including an anode including two D-shaped cavities.

Referring to FIG. 5, battery 36 includes cathode 38, an anode consisting of two generally D-shaped cavities 40, separator 42, and cylindrical housing 44.

Figure 6:
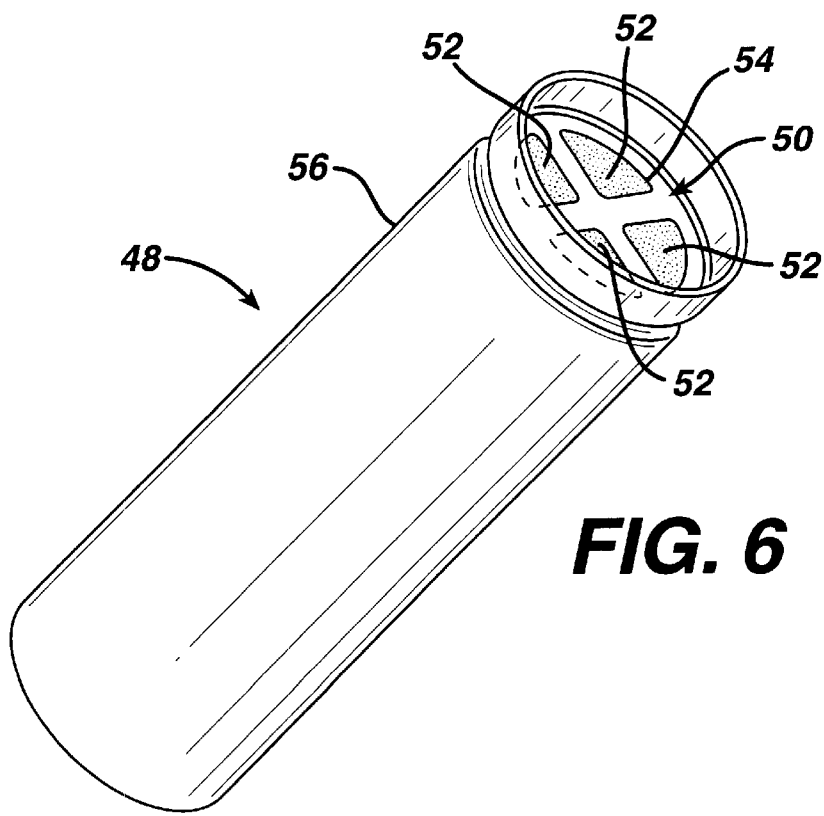
FIG. 6 is a perspective view of a battery including an anode including four pie-shaped cavities.

Referring to FIG. 6, battery 48 includes a cathode 50, an anode consisting of four pie shaped cavities 52, separators 54, and cylindrical housing 56.

Figure 7:
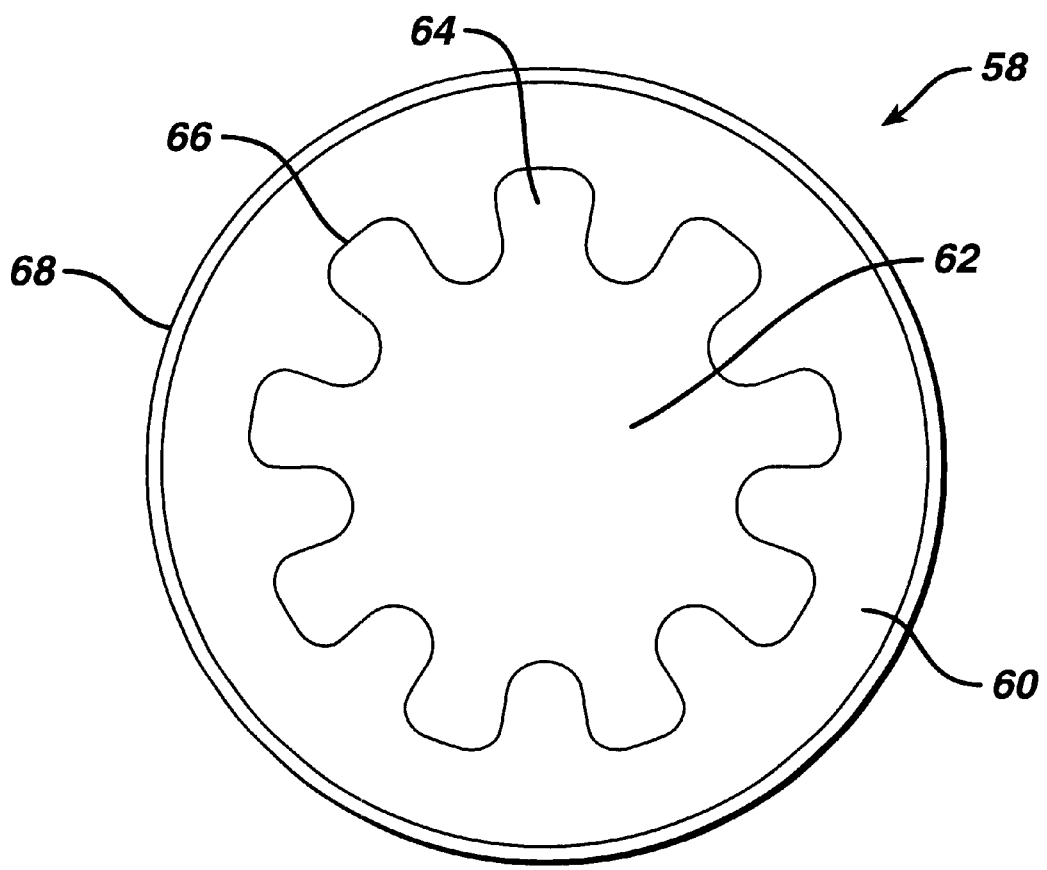
FIG. 7 is a cross-sectional view of a battery including a central anode having nine lobes.

Referring to FIG. 7, battery 58 includes a cathode 60, and anode 62 including nine lobes (see, e.g., lobe 64), a separator 66, and a cylindrical housing 68.

Table 1 provides $(S/V)^2$ information for the embodiments shown in FIGS. 1, 2, and 5–7, for various battery sizes, along with estimates for $(S/V)^2$ for the four cavity design in Mick et al., U.S. Pat. No. 5,869,205 (the "Mick Patent").

TABLE 1

| Cell size ID | $(S/V)^2$ | $(S/V)^2/D$ | Cell_OD | Cathode OD |
|---|---|---|---|---|
| PRESENT ART | | | | |
| AAAA | 0.454 | 0.06135 | 7.8 | 7.4 |
| AAA | 0.248 | 0.02532 | 10.175 | 9.775 |
| AA | 0.121 | 0.00906 | 13.81 | 13.31 |
| C | 0.041 | 0.00168 | 25.21 | 24.71 |
| D | 0.024 | 0.00074 | 32.89 | 32.39 |

TABLE 1-continued

| Cell size ID | (S/V)^2 | (S/V)^2/D | Cell_OD | Cathode OD |
|---|---|---|---|---|
| 5 Lobes | | | | |
| AAAA | 1.741 | 0.23527 | 7.8 | 7.4 |
| AAA | 0.846 | 0.08655 | 10.175 | 9.775 |
| AA | 0.451 | 0.03388 | 13.81 | 13.31 |
| C | 0.134 | 0.00542 | 25.21 | 24.71 |
| D | 0.078 | 0.00241 | 32.89 | 32.39 |
| 9 Lobes | | | | |
| AAAA | 2.92 | 0.93459 | 7.8 | 7.4 |
| AAA | 1.396 | 0.14281 | 10.175 | 9.775 |
| AA | 0.81 | 0.06086 | 13.81 | 13.31 |
| C | 0.249 | 0.01008 | 25.21 | 24.71 |
| D | 0.144 | 0.00445 | 32.89 | 32.39 |
| 2 Cavities | | | | |
| AAAA | 1.15 | 0.15541 | 7.8 | 7.4 |
| AAA | 0.613 | 0.06273 | 10.175 | 9.775 |
| AA | 0.334 | 0.02510 | 13.81 | 13.31 |
| C | 0.118 | 0.00478 | 25.21 | 24.71 |
| D | 0.07 | 0.00216 | 32.89 | 32.39 |
| 4 Cavities | | | | |
| AAAA | 2.2 | 0.29730 | 7.8 | 7.4 |
| AAA | 1.106 | 0.11315 | 10.175 | 9.775 |
| AA | 0.65 | 0.04884 | 13.81 | 13.31 |
| C | 0.203 | 0.00822 | 25.21 | 24.71 |
| D | 0.121 | 0.00374 | 32.89 | 32.39 |
| MICK (estimated from their 4 cavity anode) | | | | |
| AAAA | 1.072 | 0.14492 | 7.8 | 7.4 |
| AAA | 0.611 | 0.06240 | 10.175 | 9.775 |
| AA | 0.332 | 0.02496 | 13.81 | 13.31 |
| C | 0.096 | 0.00390 | 25.21 | 24.71 |
| D | 0.056 | 0.00173 | 32.89 | 32.39 |

Figure 8:
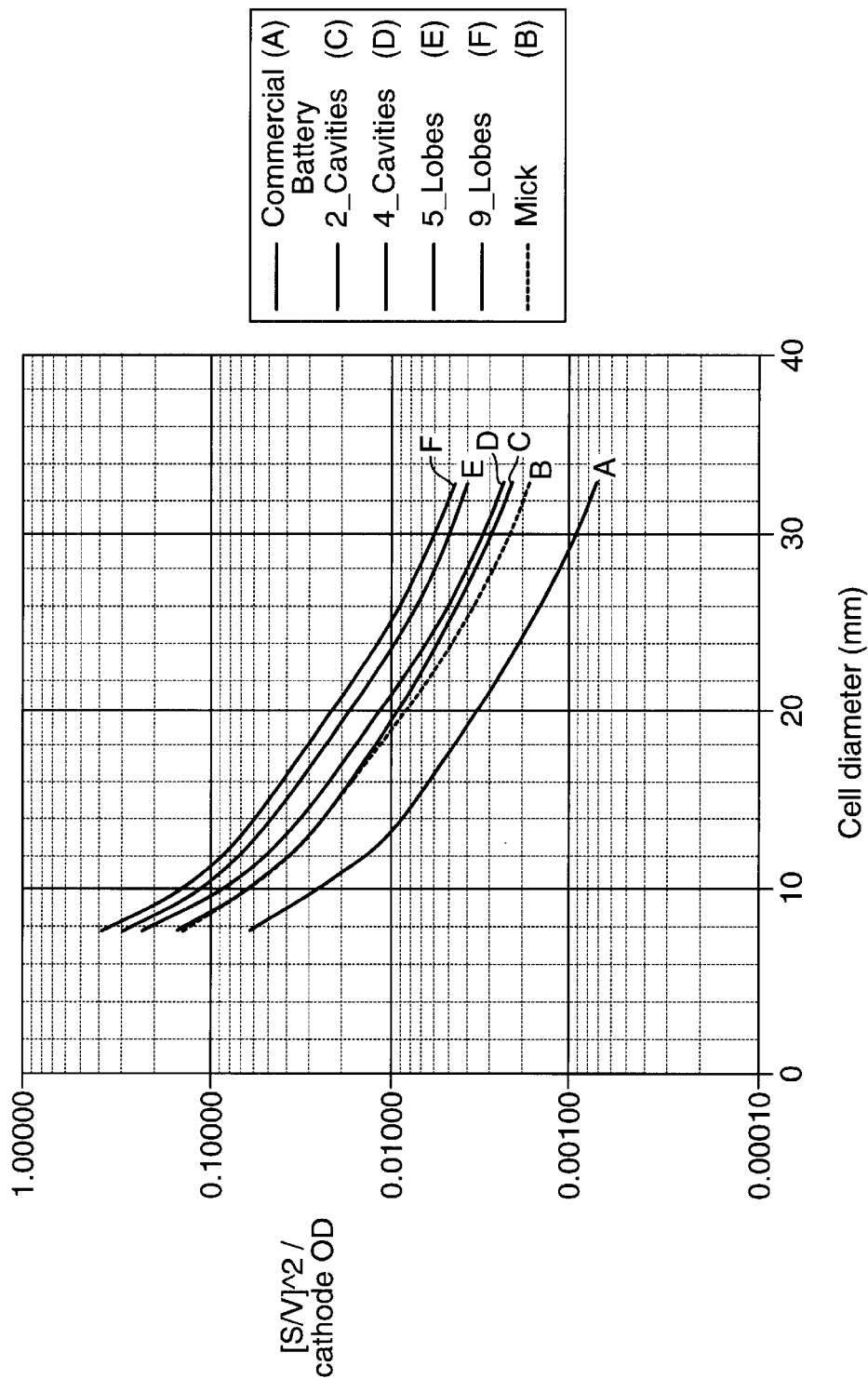
FIG. 8 is a plot of $(SV)^2$/cathode diameter v. cell diameter for five batteries.

V = cathode volume
S = cathode surface area between anode - cathode (~ separator surface area)
D = cathode (OD) outside diameter Referring to FIG. 8, $(S/V)^2$/cathode OD is plotted against cell diameter for commercial AAAA, AAA, AA, C, and D batteries, the four anode cavity battery in the Mick patent, and the embodiments shown in FIGS. 1, 2, and 5–7. The plot for the commercial batteries will be referred to herein as "Plot A"; the plot for the four anode cavity battery in the Mick patent will be referred to herein as "Plot B"; the plot for the embodiment in FIG. 5 will be referred to herein as "Plot C"; the plot for the embodiment in FIG. 6 will be referred to herein as "Plot D"; the plot for the embodiment in FIGS. 1 and 2 will be referred to herein as "Plot E"; and the plot for the embodiment in FIG. 7 will be referred to herein as "Plot F". Plots C–F are above Plot A, and Plots D–F are above Plot B.

Other embodiments are within the claims. For example, the positions of the anode and cathode may be reversed. In addition, the anode may include two lobes, three lobes, four lobes, or six to eight lobes.

What is claimed is:

1. A primary alkaline AA battery, comprising:
a housing;
a cathode within the housing;
an anode within the housing; and
a separator electrically separating the anode and the cathode;
wherein the battery has an $(S/V)^2$ value of greater than 0.38 mm$^{-2}$.

2. The battery of claim 1, wherein the battery has an $(S/V)^2$ value of greater than 0.42 mm$^{-2}$.

3. The battery of claim 1, wherein the battery has an $(S/V)^2$ value of greater than 0.45 mm$^{-2}$.

4. A primary alkaline AAA battery, comprising:
a housing;
a cathode within the housing;
an anode within the housing; and
a separator electrically separating the anode and the cathode;
wherein the battery has an $(S/V)^2$ value of greater than 0.70 mm$^{-2}$.

5. The battery of claim 4, wherein the battery has an $(S/V)^2$ value of greater than 0.75 mm$^{-2}$.

6. The battery of claim 4, wherein the battery has an $(S/V)^2$ value of greater than 0.8 mm$^{-2}$.

7. A primary alkaline AAAA battery, comprising:
a housing;
a cathode within the housing;
an anode within the housing; and
a separator electrically separating the anode and the cathode;
wherein the battery has an $(S/V)^2$ value of greater than 1.2 mm$^{-2}$.

8. The battery of claim 7, wherein the battery has an $(S/V)^2$ value of greater than 1.4 mm$^{-2}$.

9. The battery of claim 7, wherein the battery has an $(S/V)^2$ value of greater than 1.5 mm$^{-2}$.

10. A primary alkaline C battery, comprising:
a housing;
a cathode within the housing;
an anode within the housing; and
a separator electrically separating the anode and the cathode;
wherein the battery has an $(S/V)^2$ value of greater than 0.110 mm$^{-2}$.

11. The battery of claim 10, wherein the battery has an $(S/V)^2$ value of greater than 0.120 mm$^{-2}$.

12. The battery of claim 10, wherein the battery has an $(S/V)^2$ value of greater than 0.125 mm$^{-2}$.

13. A primary alkaline D battery, comprising:
a housing;
a cathode within the housing;
an anode within the housing; and
a separator electrically separating the anode and the cathode;
wherein the battery has an $(S/V)^2$ value of greater than 0.065 mm$^{-2}$.

14. The battery of claim 13, wherein the battery has an $(S/V)^2$ value of greater than 0.07 mm$^{-2}$.

15. The battery of claim 13, wherein the battery has an $(S/V)^2$ value of greater than 0.075 mm$^{-2}$.

16. A primary alkaline AA battery, comprising:
a housing;
a cathode within the housing;
a single cavity anode within the cathode; and
a separator electrically separating the anode and the cathode;
wherein the battery has an $(S/V)^2$ value of greater than 0.15 mm$^{-2}$.

17. The battery of claim 16, wherein the battery has an $(S/V)^2$ value of greater than 0.20 mm$^{-2}$.

18. The battery of claim 16, wherein the battery has an $(S/V)^2$ value of greater than 0.30 mm$^{-2}$.

19. A primary alkaline AAA battery, comprising:

a housing;

a cathode within the housing;

a single cavity anode within the cathode; and a separator electrically separating the anode and the cathode;

wherein the battery has an $(S/V)^2$ value of greater than 0.3 mm$^{-2}$.

20. The battery of claim 19, wherein the battery has an $(S/V)^2$ value of greater than 0.4 mm$^{-2}$.

21. The battery of claim 19, wherein the battery has an $(S/V)^2$ value of greater than 0.5 mm$^{-2}$.

22. A primary alkaline AAAA battery, comprising:

a housing;

a cathode within the housing;

a single cavity anode within the cathode; and a separator electrically separating the anode and the cathode;

wherein the battery has an $(S/V)^2$ value of greater than 0.6 m$^{-2}$.

23. The battery of claim 22, wherein the battery has an $(S/V)^2$ value of greater than 0.8 mm$^{-2}$.

24. The battery of claim 22, wherein the battery has an $(S/V)^2$ value of greater than 1.0 mm$^{-2}$.

25. A primary alkaline C battery, comprising:

a housing;

a cathode within the housing;

a single cavity anode within the cathode; and a separator electrically separating the anode and the cathode;

wherein the battery has an $(S/V)^2$ value of greater than 0.06 mm$^{-2}$.

26. The battery of claim 25, wherein the battery has an $(S/V)^2$ value of greater than 0.08 mm$^{-2}$.

27. The battery of claim 25, wherein the battery has an $(S/V)^2$ value of greater than 0.10 mm$^{-2}$.

28. A primary alkaline D battery, comprising:

a housing;

a cathode within the housing;

a single cavity anode within the cathode; and a separator electrically separating the anode and the cathode;

wherein the battery has an $(S/V)^2$ value of greater than 0.03 mm$^{-2}$.

29. The battery of claim 28, wherein the battery has an $(S/V)^2$ value of greater than 0.04 mm$^{-2}$.

30. The battery of claim 28, wherein the battery has an $(S/V)^2$ value of greater than 0.05 mm$^{-2}$.

31. The battery of claim 1, 4, 7, 10, 13, 16, 19, 22, 25, or 28 wherein the cathode comprises manganese dioxide.

32. The battery of claim 1, 4, 7, 10, 13, 16, 19, 22, 25, or 28 wherein the anode comprises zinc.

33. The battery of claim 1, 4, 7, 10, 13, 16, 19, 22, 25, or 28 wherein the cathode comprises manganese dioxide and the anode comprises zinc.

34. The battery of claim 1, 4, 7, 10, 13, 16, 19, 22, 25, or 28, wherein the anode comprises a lobed cavity within the cathode.

35. The battery of claim 34, wherein the anode includes only two lobes.

36. The battery of claim 34, wherein the anode includes three lobes.

37. The battery of 34, wherein the anode includes four lobes.

38. The battery of claim 34, wherein the anode includes fives lobes.

39. The battery of claim 34, wherein the anode includes nine lobes.

40. The battery of claims 1, 4, 7, 10, 13, 16, 19, 22, 25, or 28, wherein the anode includes multiple cavities within the cathode.

41. The battery of claim 40, wherein the multiple cavities comprise two D-shaped cavities.

42. The battery of claim 41, wherein the anode further includes a connection between the two D-shaped cavities.

43. The battery of claim 41, wherein the anode does not include a connection between the D-shaped cavities.

44. The battery of claim 40, wherein the cavities include two pie-shaped cavities.

45. The battery of claim 44, wherein the cavities include three pie-shaped cavities.

46. The battery of claim 45, wherein the cavities include four pie-shaped cavities.

* * * * *

(12) EX PARTE REEXAMINATION CERTIFICATE (9868th)
United States Patent
Luo et al.

(10) Number: US 6,410,187 C1
(45) Certificate Issued: Oct. 11, 2013

(54) PRIMARY ALKALINE BATTERY

(75) Inventors: Weifang Luo, Norwood, MA (US); Bhupendra K. Patel, Mansfield, MA (US); Alexander B. Shelekhin, Acton, MA (US); John D. Sillesky, Franklin, MA (US); Viet H. Vu, Medway, MA (US); Douglas Woodnorth, Needham, MA (US)

(73) Assignee: The Gillette Company, Boston, MA (US)

Reexamination Request:
No. 90/010,769, Dec. 11, 2009

Reexamination Certificate for:
Patent No.: 6,410,187
Issued: Jun. 25, 2002
Appl. No.: 09/393,043
Filed: Sep. 9, 1999

(51) Int. Cl.
*H01M 6/06* (2006.01)

(52) U.S. Cl.
CPC .................................... *H01M 6/06* (2013.01)
USPC ........... 429/206; 429/164; 429/165; 429/209; 429/246

(58) Field of Classification Search
USPC ......................................................... 429/206
See application file for complete search history.

(56) References Cited

To view the complete listing of prior art documents cited during the proceeding for Reexamination Control Number 90/010,769, please refer to the USPTO's public Patent Application Information Retrieval (PAIR) system under the Display References tab.

*Primary Examiner* — Carlos N. Lopez

(57) ABSTRACT

A primary alkaline battery includes a housing, a cathode within the housing, an anode within the housing, and a separator electrically separating the anode and the cathode. The battery has a substantial $(S/V)^2$ value.

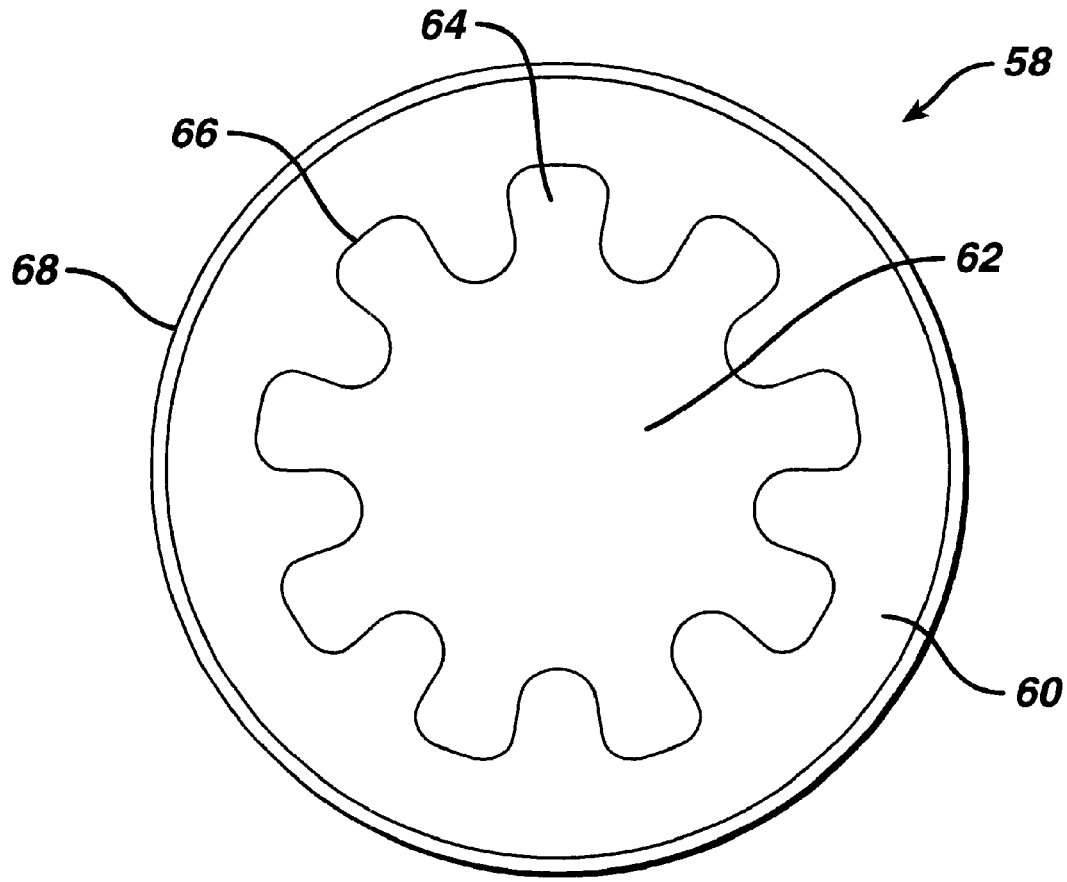

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-46 are cancelled.

\* \* \* \* \*